United States Patent [19]

Prescott et al.

[11] 4,024,884

[45] May 24, 1977

[54] CLOSING ASSIST FOR VALVES

[75] Inventors: Norman F. Prescott, Wenham; Herbert Cook, Revere, both of Mass.

[73] Assignee: Atwood & Morrill Co., Salem, Mass.

[22] Filed: Feb. 9, 1976

[21] Appl. No.: 656,666

Related U.S. Application Data

[63] Continuation-in-part of Ser. No. 490,616, July 22, 1974, abandoned.

[52] U.S. Cl. .................................. 251/38; 60/547; 60/572; 251/44; 251/57
[51] Int. Cl.² ........................................ F16K 31/12
[58] Field of Search ............ 91/417 R, 436; 60/542, 60/544, 571, 572, 547; 251/29, 31, 33, 38, 57, 5, 44; 137/82

[56] References Cited

UNITED STATES PATENTS

| 1,918,424 | 7/1933 | Pontow et al. ..................... 60/571 |
| 2,758,811 | 8/1956 | Peterson .............................. 251/38 |
| 2,795,391 | 6/1957 | Krone et al. ......................... 251/38 |
| 3,182,971 | 5/1965 | Wakeman et al. ................... 251/57 |
| 3,226,078 | 12/1965 | Anderson ............................ 251/31 |
| 3,690,616 | 9/1972 | Lewis et al. ......................... 251/38 |
| 3,763,744 | 10/1973 | Fournell et al. ................. 91/417 R |
| 3,824,896 | 7/1974 | Tull ..................................... 91/436 |

FOREIGN PATENTS OR APPLICATIONS 948,243  1/1964  United Kingdom ................... 251/5

*Primary Examiner*—Martin P. Schwadron
*Assistant Examiner*—G. L. Walton
*Attorney, Agent, or Firm*—Marvin A. Naigur; John E. Wilson

[57] ABSTRACT

A shutoff valve in a line containing fluid under pressure which after being closed is held closed by another fluid under pressure. The other fluid is one such as air which is available at the valve.

4 Claims, 2 Drawing Figures

CLOSING ASSIST FOR VALVES

This is a continuation of application Ser. No. 490,616, filed July 22, 1974 now abandoned.

BACKGROUND OF THE INVENTION

Large valves are often designed so that the fluid in the line in which the valve is placed is used to assist in closing the valve and maintaining it closed. For example, in large steam isolation valves the main poppet is usually integral with a closure member which includes a piston which is partially placed in an auxiliary chamber which is fed with fluid from the line so that the poppet can be moved in a direction generally away from the chamber and toward the valve seat without having to exert a large force on the closure member through the valve stem. The fluid directed continuously into the chamber as the valve is closing so that there is no large pressure differential across the closure member.

There are instances where it is desirable to add to the force which acts on the closure member to maintain the valve shut. For example, the valve will periodically be tested for seat tightness. Such tests are usually conducted by applying a pneumatic pressure, which is considerably less than the operating line pressure upstream and downstream of the valve. A pneumatic test can easily apply a pressure which unseat the valve and therefore prevent a valid evaluation of the seat tightness.

SUMMARY OF THE INVENTION

It is an object of the present invention to overcome drawbacks found in the prior art such as those discussed above. Accordingly, a shut-off valve in a line carrying fluid under pressure is provided with a piston which is connected with the valve stem and which can be acted on by a fluid other than the line fluid to maintain the valve in closed position.

DETAILED DESCRIPTION OF THE PREFERRRED EMBODIMENT

Figure 1:
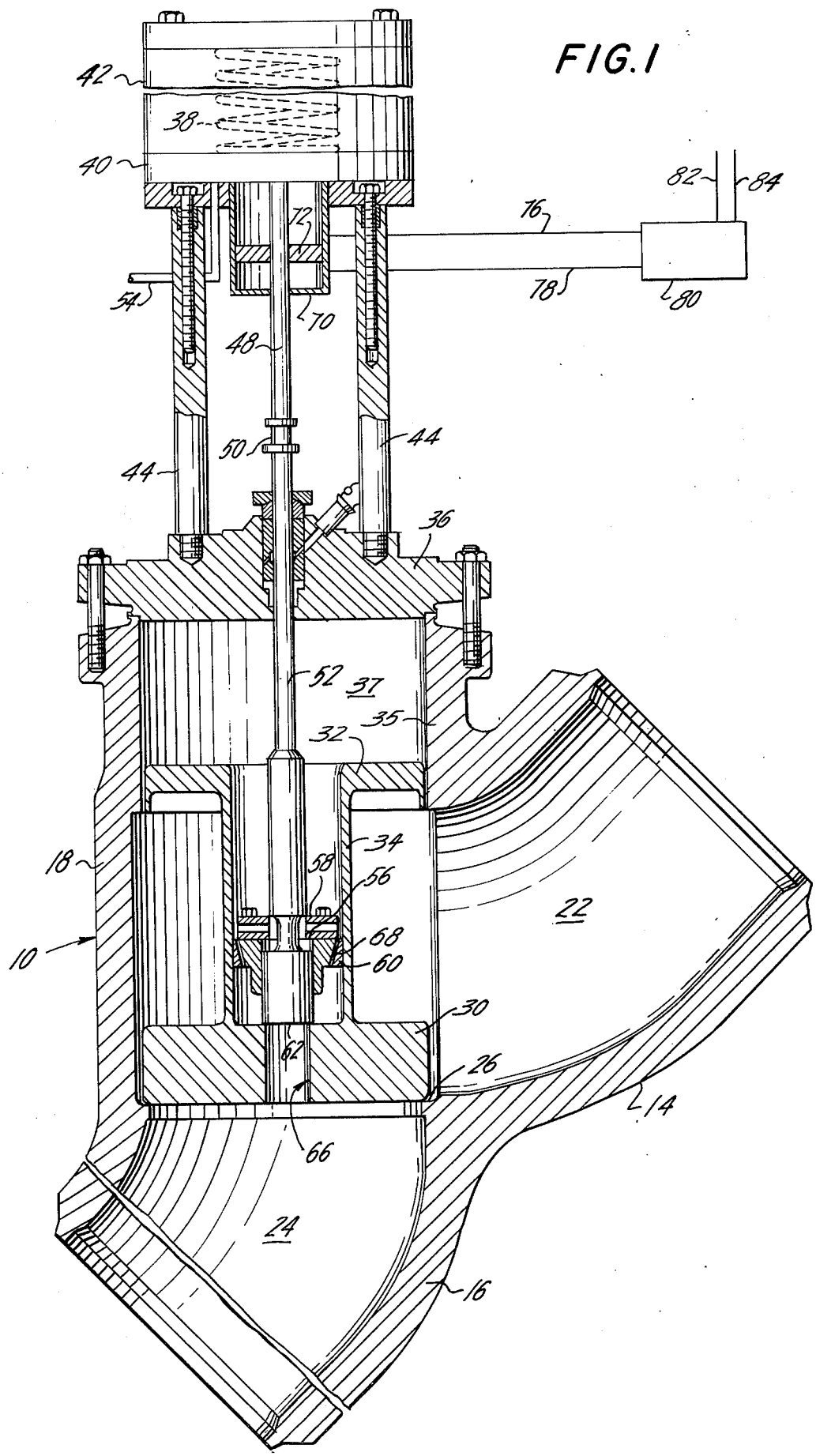
FIG. 1 is a side view, partly in section, of a valve made in accordance with the present invention.

As shown in FIG. 1, a shutoff valve indicated generally as 10 made in accordance with the present invention, has a valve body 12 which includes an inlet portion 14 and an outlet portion 16, each of which can be secured to pipes, not shown, so that the inlet portion 14 and the outlet portion 16 form with the pipes a line which would be suitable to contain fluid under pressure and which would normally move in the direction of the arrows. The valve body 12 also includes a valve portion 18 which extends upwardly and at an angle with respect to the stream of fluid flowing from the inlet portion 14 to the outlet portion 16. Within the inlet portion 14 is an inlet chamber 22 and within the outlet portion 16 is an outlet chamber 24. The inlet chamber 22 and the outlet chamber 24 are separated by an annular main valve seat 26. A main poppet 30 at its marginal edge portion seats against the valve seat 26 when the main poppet 30 is in its closed position, as shown in FIG. 1.

The valve 10 also includes an auxiliary piston 32 which is fixed to the poppet 30 by a sleeve portion 34.

The poppet 30, auxiliary piston 32 and sleeve portion 34 make up a closure member. The auxiliary piston 32 is fitted within the valve portion 18 which has an upper cylindrical section 35 which is closed at its top by a head 36 which is bolted to the top of the valve portion 18. The cylindrical section 35 and the head 36 define an auxiliary chamber 37.

The valve is shown in FIG. 1 in its closed position. It is closed by means of a spring 38 which is engaged at its bottom by a piston 40 within a power cylinder 42. The spring 38 is thus positioned within the power cylinder 42 and is compressed between the piston 40 and the top of the cylinder 42. The power cylinder 42 is secured by bolts 44 to the head 36 so that the power cylinder 42 is always maintained a given distance from the valve body 12. The piston 40 is fixed on a piston rod 48 which is secured at 50 to a valve stem 52.

A compressed air line 54 leads into the bottom of the power cylinder 42 so that when air under sufficient pressure flows through the line 54 it will raise the piston 40 against the action of the spring 38 to raise the piston rod 48 and valve stem 52. This will raise the main poppet 30 because the stem 52 has a shoulder 56 which rides in an annular plate 58 which is bolted to a ring 60 within the sleeve portion 34. The annular plate 58 has an inner diameter less than the outer diameter of the shoulder 56 so that the stem 52 can move upward only sightly before it will lift the main poppet 30 off of the main poppet seat 26. In effect, the shoulder 56 and the annular plate 58 comprise a lost motion connection between the valve stem 52 and the sleeve portion 34.

The stem 52 has at its end a pilot valve 62 which engages a pilot valve seat 64 which encircle a pilot valve port 66 which extends through the poppet 30. When the stem 52 is raised by air pressure in the air line 54 and power cylinder 42, it will move the pilot valve poppet 62 upward to allow fluid to escape from the auxiliary chamber 37 through channels 68 in the ring 60. This allows the auxiliary piston 32 and the main poppet 30 to move upward without interference from fluid within the auxiliary chamber 37 because that fluid will escape through the channels 68 and the pilot valve port 66.

When it is attempted to close the present valve, air pressure in the line 54 is released so that pressure below the piston 40 decreases and the spring 38 drives the piston 40, the piston rod 48 and the valve stem 52 and main poppet 30 downward. Fluid is allowed into the auxiliary chamber 37 because the auxiliary piston 32 is of a diameter slightly less than that of the auxiliary chamber 37. This prevents a large difference in pressures between the auxiliary piston 32 and the poppet 30. With a "balanced design" of this sort, the main poppet 30 need not be moved against a large pressure differential. Once the main valve poppet 30 is seated, pressure within the outlet chamber 24 will tend to raise it and therefore to open the valve. In order to prevent this, a closing assist system is provided. The system allows the exertion of a force in addition to that usually employed to close valves of this type and maintain them closed.

To this end a closing speed control cylinder 70 is utilized. The cylinder 70 is positioned axially with respect to the power cylinder 42 and directly below it. A speed control piston 72 is fixed to the piston rod 48 to move in unison with the closing piston 40. Hydraulic fluid communicates into the speed control cylinder 70 through the hydraulic lines 76 and 78 which lead to a closing control system 80 which for reasons which will presently appear is connected to the air lines 82 and 84.

Figure 2:
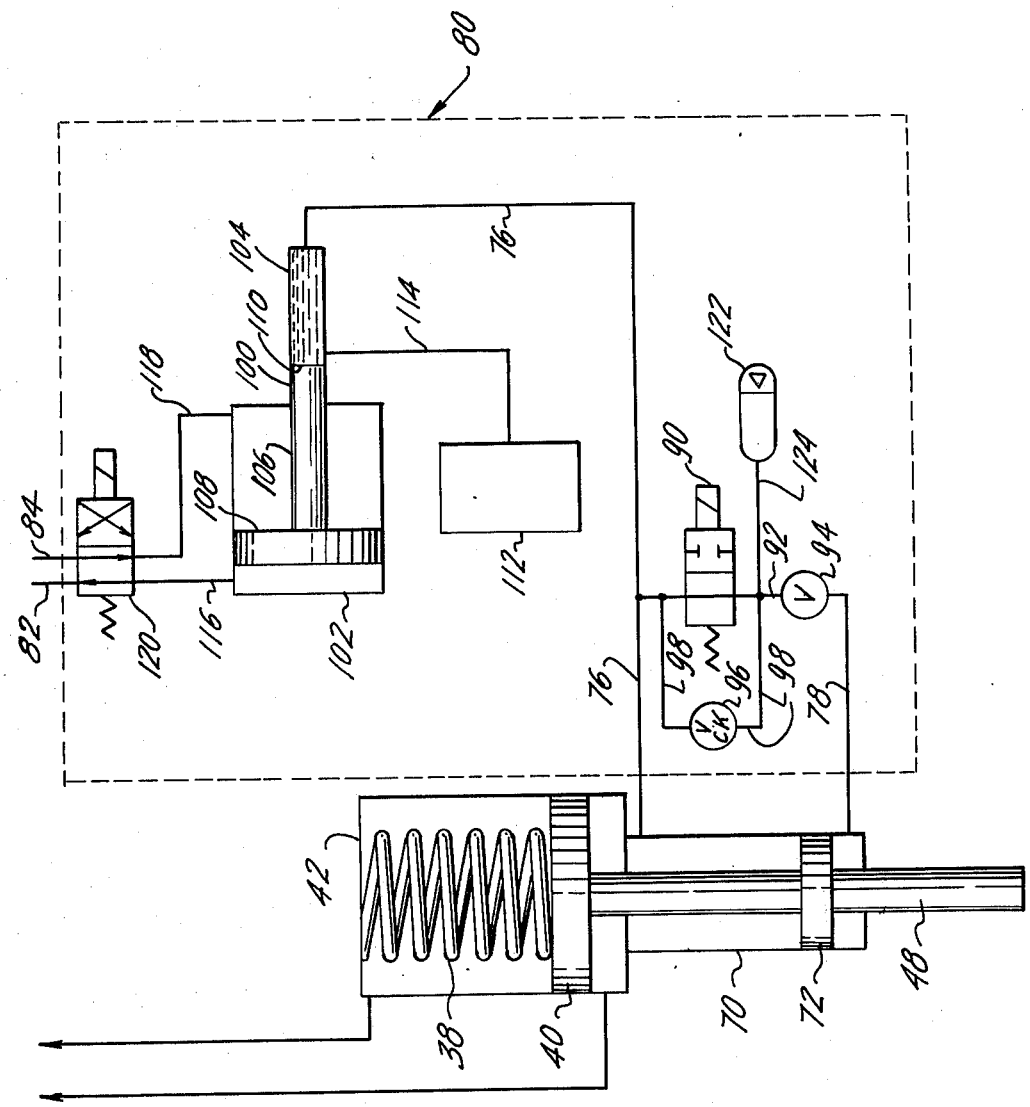
FIG. 2 is a diagrammatic view showing in detail certain portions of the mechanism shown in FIG. 1.

For clarity, the power cylinder 42, spring 38, and piston 40 are schematically shown integrated with the closing speed control cylinder 70 and the closing control system 80 in FIG. 2. The closing control system 80 includes a solenoid-operated two-way valve 90 which is placed in a hydraulic line 92 which bridges the hydraulic lines 76 and 78. Also, in the line 92, in series with the valve 90, is a flow control valve 94. A check valve 96 is connected at its ends, to a hydraulic line 98 which at its ends is connected to the hydraulic line 92.

Although the hydraulic line 78 from the bottom of the closing speed control cylinder 70 ends at the hydraulic line 92, the hydraulic line 76 from the top of the closing speed control cylinder 70 extends to an air oil booster 100. The air oil booster 100 has an air cylinder 102 and an oil cylinder 104. The air oil booster 100 includes a piston rod 106 which is connected between an air piston 108 at one end and an oil piston 110 at the other end. As clearly shown, the air piston is considerably larger in area than is the oil piston. The oil cylinder communicates with an oil tank 112 through an oil line 114. The oil tank 112 serves as a reservoir to assure a supply of oil at the oil cylinder 104 when the air oil booster is actuated.

Compressed air can be directed into and exhausted from the air cylinder 102 by the air lines 116 and 118 by means of a four-way solenoid operated valve 120. In operation, the additional closing force applied after the valve 10 has been fully closed, is applied by energizing the solenoid valve 90 which thereby prevents communication through the hydraulic line 92 so that there will be no flow through the lines 76 and 78 between the top of the closing speed control cylinder and the bottom thereof. Subsequently, the four-way solenoid operated valve 120 is operated so that air pressure from air supply line 82 is exerted to the left of the air cylinder 102 (as seen in FIG. 2) and air is exhausted through air line 118 to the atmosphere through air exhaust line 84. This will drive the air piston 108 to the right to raise the oil in the oil cylinder 104 to a pressure which is much greater than the air pressure on the left side of the air cylinder 102. This is due, of course, to the large differences in the area between the air piston 108 and the oil piston 110. The oil pressure is communicated to the top of the closing speed control cylinder 70 through the hydraulic line 76. This generates the additional closing force.

The volume of oil displaced from the bottom of the closing speed control cylinder 70 will be extremely small because the solenoid valve 90 is not closed until the main poppet 30 has been seated and the piston rod 48 has substantially reached the end of its travel. In the event that a small amount of oil would have to be displaced in order to prevent its resisting the exertion of the oil pressure downward on the speed control piston 72 such oil can be easily absorbed by an accumulator 122 which is connected by a hydraulic line 124 to the hydraulic line 92.

The check valve 96 is included as a safety precaution. In the event that the valve 10 were in the open position and the solenoid operated valve 90 for any reason was in the closed position, the valve 10 still be closed because the oil in the lower end of the closing speed control cylinder 70 would be displaced to the upper end thereof through the check valve 98.

The foregoing describes but one preferred embodiment of the present invention, other embodiments being possible without exceeding the scope of the present invention as defined in the followng claims.

What is claimed is:

1. A shut-off valve for use in a line carrying steam under pressure comprising:

a valve body;

an inlet in said valve body;

an outlet in said valve body;

a circular main valve seat between said inlet and said outlet;

a cylindrical section in said valve body coaxial with and spaced from said valve seat;

a closure member slidably engaged in said cylindrical section on the upstream side of said valve seat, said closure member engaging said main valve seat when said shut-off valve is in closed position;

a valve stem connected with said closure member and extending through said valve body to the exterior thereof;

spring means urging said stem and said closure member toward said valve seat;

a power cylinder rigidly connected to said valve body above said body said power cylinder being concentric with said cylindrical section;

a power piston slidably mounted within said power cylinder;

a piston rod connected to said piston and extending downward from said piston and through said power cylinder, said piston rod being connected at its bottom to said stem;

a control cylinder, rigidly connected with said power cylinder, intermediate said power cylinder and said valve body;

a pilot valve port extending downward through said closure member;

a pilot valve seat on the upper end of said pilot passage;

a pilot valve at the lower end of said stem, said closure member being connected to said stem for limited sliding movement, said pilot valve engaging said pilot valve seat when said stem is displaced to the limit of its movement relative to said closure member in the direction of said pilot passage, said pilot valve being disengaged from said pilot valve seat when said stem is displaced to the limit of its movement relative to said closure member in the direction away from said pilot valve port;

a control piston slidably mounted within said control cylinder and connected to said piston rod;

a first oil line connected to said control cylinder above said control piston;

an air-oil booster connected with said first oil line;

a second oil line connected to said control cylinder below said control piston;

an oil valve connected between said first oil line and said second oil line so that when said oil valve is closed oil will flow only through said first oil line;

an air-oil booster connected with said first oil line;

a first air line carrying air under pressure, said first air line being connected to said air-oil booster;

whereby air pressure in said power-cylinder below said power piston can be released so that said spring means will move said valve stem and said closure member toward said valve seat with said control cylinder regulates the speed at which said shut-off valve can be closed, actuation of said air valve will allow air from said first air line to act on said air-oil booster so that oil in said first oil line and in said control cylinder above said control piston will be pressurized to urge said control piston and said closure member toward said seat to close said valve and to prevent fluid flow between said inlet and said outlet.

2. The shut-off valve defined in claim 1 wherein said air valve is a four-way valve and said air-oil booster comprises an air cylinder, an oil cylinder, an oil piston and an air piston connected to said oil piston, said first air line being connected to one end of said air cylinder, a second air line connected between said air valve and the other end of said air cylinder, whereby said air valve can be positioned to direct air under pressure from said first air line to one end of said air cylinder and to exhaust air from said other end of said cylinder into said second air line and to the atmosphere to move said air piston and said oil piston so that oil is pressurized in said oil line.

3. The shut-off valve defined in claim 2 further comprising a check valve connected in parallel with said oil valve, said check valve permitting oil flow past said oil valve only in a direction toward said first oil line.

4. The shut-off valve defined in claim 3 further comprising an oil tank, said oil tank being connected with said oil cylinder.

* * * * *